United States Patent [19]
Hoy et al.

[11] Patent Number: 5,765,017
[45] Date of Patent: Jun. 9, 1998

[54] METHOD AND SYSTEM IN A DATA PROCESSING SYSTEM FOR EFFICIENT MANAGEMENT OF AN INDICATION OF A STATUS OF EACH OF MULTIPLE REGISTERS

[75] Inventors: Thomas Alan Hoy; Terence M. Potter; Paul Charles Rossbach, all of Austin, Tex.

[73] Assignees: International Business Machines Corporation, Armonk, N.Y.; Motorola, Inc., Schaumburg, Ill.

[21] Appl. No.: 785,149

[22] Filed: Jan. 13, 1997

[51] Int. Cl.⁶ .................................................. G06F 15/76
[52] U.S. Cl. ................................... 395/800.23; 395/392
[58] Field of Search .................................. 395/391, 392, 395/393, 670, 674, 800.01, 800.13, 800.23; 711/100, 128, 133, 210

[56] References Cited

U.S. PATENT DOCUMENTS

| | | | |
|---|---|---|---|
| 4,992,938 | 2/1991 | Cocke et al. | 395/393 |
| 5,465,373 | 11/1995 | Kahle et al. | 395/391 |
| 5,491,829 | 2/1996 | Kau et al. | 395/800.23 |
| 5,590,295 | 12/1996 | Deosaram et al. | 395/393 |
| 5,630,149 | 5/1997 | Bluhm | 395/393 |
| 5,652,774 | 7/1997 | Eickemeyer et al. | 395/393 |
| 5,671,383 | 9/1997 | Valentine | 395/392 |
| 5,675,759 | 10/1997 | Shebanow et al. | 395/393 |
| 5,708,837 | 1/1998 | Handlogten | 395/393 |

*Primary Examiner*—Alpesh M. Shah
*Attorney, Agent, or Firm*—Lisa B. Yociss; Andrew J. Dillon

[57] ABSTRACT

A method and system in a data processing system are disclosed for efficiently managing an indication of a status of each of a plurality of registers included with the data processing system. An array is established having multiple entry fields for storing multiple entries. Each of the multiple entry fields is associated with a different one of the plurality of registers. A status of each of the plurality of registers is determined. A plurality of partitions are established within the array. Each of the partitions are concurrently accessible by the data processing system. A plurality of the multiple entry fields are associated with one of the plurality of partitions. An entry is stored in each of the multiple entry field. The entry includes the status of each of the plurality of registers. Each entry is associated with one of the partitions so that a plurality of the multiple entries may be concurrently accessed.

8 Claims, 6 Drawing Sheets

METHOD AND SYSTEM IN A DATA PROCESSING SYSTEM FOR EFFICIENT MANAGEMENT OF AN INDICATION OF A STATUS OF EACH OF MULTIPLE REGISTERS

BACKGROUND

1. Technical Field

The depicted illustrative embodiment relates to superscalar data processing systems, and in particular to efficient management of an indication of a status of each of a plurality of registers in a superscalar data processing system. Still more particularly, the illustrative embodiment relates to the storage of multiple entries, each entry including a status of a register, in multiple entry fields within an array having a plurality of partitions, wherein each entry is associated with one of the partitions so that a plurality of the multiple entries may be concurrently accessed.

2. Description of the Related Art

A superscalar data processing system is a data processing system which includes a microprocessor architecture which is capable of executing multiple instructions per clock cycle. In order to execute multiple instructions per clock cycle, multiple independent functional units that can execute concurrently are required. These multiple instructions may be executed in their original sequence, or out of order in a sequence which is different in some way from the original sequence.

The overlap of the fetching and decoding of one instruction with the execution of a second instruction is called pipelining. In pipelined superscalar data processing systems, care must be taken to avoid dependencies where multiple instructions are fetched, decoded, and executed in a single cycle.

There are three types of data dependencies. A read after write hazard occurs when an instruction tries to read a source before a previous instruction writes it. A write after read hazard occurs when an instruction tires to write a destination before a previous instruction reads it. A write after write hazard occurs when an instruction writes a destination before a previous instruction writes it.

One solution to solving the dependence problem is to rename the logical registers associated with the instructions. By renaming the logical registers, each instruction within the cycle can be executed concurrently and correctly.

One problem in the design of microprocessors is the management of available resources. Resources typically become free after some period of time and are then available to be utilized again. Resources may include, among others, execution units, buses, or registers. One type of register resource is a rename register which is typically utilized for storing multiple entries which include a relationship between a logical register and the physical register for that logical register. A plurality of physical registers may exist for storing data relating to a plurality of renamed logical registers.

During each clock cycle, a plurality of physical registers must be available to store data relating to logical registers which are destination registers for the multiple instructions which are being dispatched during the cycle. For example, if four instructions may be concurrently dispatched during a single clock cycle, there should be four physical registers free and available to store data relating to logical registers which may be renamed during the dispatch of the instructions.

During each cycle, a physical register may become available because an instruction which had been renamed has completed processing and the rename register is no longer needed. When the physical register becomes available, it may be utilized as the rename register associated with the logical register of another instruction.

Efficient management of resources within a superscalar data processing system is important. For example, in microprocessors that support out-of-order execution of instructions, there is generally a pool of rename registers available for use. One common solution to manage the available rename registers is to implement a first-in-first-out (FIFO) through a shift register or circular pointer queue. In the FIFO, multiple renames are consumed from the bottom while multiple freed renames are added to the top. The problem with this approach is that there are not always the maximum number of renames freed or added to the top of the FIFO each cycle. In these cases, additional compression logic is needed to remove empty "holes" from the incoming rename bus in order to not have empty or invalid lines in the FIFO and help ensure that the maximum number of renames are always available for consumption from the bottom of the FIFO. This compression logic adversely affects the write timing of the FIFO. In many situations, the freeing of renames and placement into the available list is the time critical operation in the rename logic. This may force the data processing system to run at a slower frequency, thus degrading performance.

Therefore a need exists for a method and system in a superscalar data processing system to efficiently manage allocation of available resources such as rename registers.

SUMMARY

It is therefore one object of the illustrative embodiment to provide an improved superscalar data processing system.

It is another object of the illustrative embodiment to provide a method and system for the efficient management of an indication of a status of each of a plurality of registers in a superscalar data processing system.

It is yet another object of the illustrative embodiment to provide a method and system within a superscalar data processing system for the storage of multiple entries, each entry including an indication of a status of a register, in multiple entry fields within an array having a plurality of partitions, wherein each entry is associated with one of the partitions so that a plurality of the multiple entries may be concurrently accessed.

The foregoing objects are achieved as is now described. A method and system in a superscalar data processing system are disclosed for efficiently managing an indication of a status of each of a plurality of registers included with the superscalar data processing system. An array is established having multiple entry fields for storing multiple entries. Each of the multiple entry fields is associated with a different one of the plurality of registers. A status of each of the plurality of registers is determined. A plurality of partitions are established within the array. Each of the partitions are concurrently accessible by the superscalar data processing system. A different plurality of multiple entry fields are associated with each of the plurality of partitions. An entry is stored in each of the multiple entry fields. Each entry includes an indication of the status of a different one of the plurality of registers. Each entry is associated with one of the partitions so that a plurality of the multiple entries may be concurrently accessed.

The above as well as additional objectives, features, and advantages of the illustrative embodiment will become apparent in the following detailed written description.

BRIEF DESCRIPTION OF THE DRAWINGS

The novel features are set forth in the appended claims. The embodiment itself, however, as well as a preferred mode of use, further objectives and advantages thereof, will best be understood by reference to the following detailed description when read in conjunction with the accompanying drawings, wherein:

DETAILED DESCRIPTION OF ILLUSTRATIVE EMBODIMENT

An exemplary embodiment of the present invention and its advantages are better understood by referring to FIGS. 1–6 of the drawings, like numerals being used for like and corresponding parts of the accompanying drawings.

Figure 1:
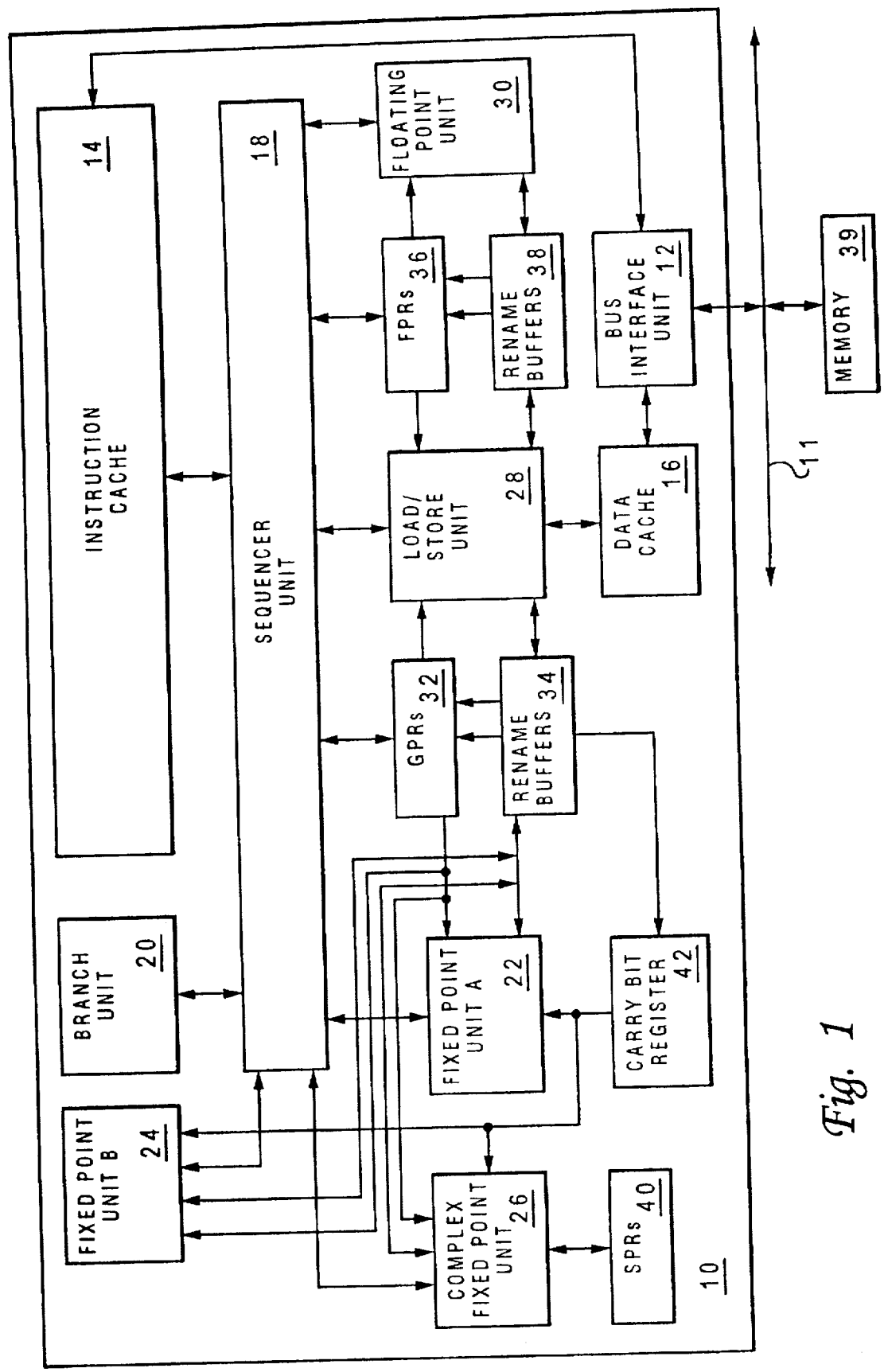
FIG. 1 depicts a high level block diagram of a superscalar data processing system 10 which may be utilized to implement the method and system of the illustrative embodiment.

FIG. 1 is a block diagram of a processor 10 system for processing information according to the preferred embodiment. In the preferred embodiment, processor 10 is a single integrated circuit superscalar microprocessor. Accordingly, as discussed further herein below, processor 10 includes various units, registers, buffers, memories, and other sections, all of which are formed by integrated circuitry. Also, in the preferred embodiment, processor 10 operates according to reduced instruction set computer ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28, and a floating point unit ("FPU") 30. FXUA 22, FXUB 24, CFXU 26, and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26, and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches the instructions to selected ones of execution units 20, 22, 24, 26, 28, and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28, and 30. Accordingly, each instruction is processed as a sequence of stages, each being executable in parallel with stages of other instructions. Such a technique is called "pipelining". In a significant aspect of the illustrative embodiment, an instruction is normally processed as six stages, namely fetch, decode, dispatch, execute, completion, and writeback.

In the fetch stage, sequencer unit 18 selectively inputs (from instruction cache 14) one or more instructions from one or more memory addresses storing the sequence of instructions discussed further hereinabove in connection with branch unit 20, and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28, and 30 after reserving rename buffer entries for the dispatched instructions' results (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out-of-order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

In the illustrative embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

Rename buffers, or registers, 34 are utilized during a register renaming process. One of rename registers 34 is selected and then associated with a logical register name for a particular instruction. Therefore, for the particular instruction, the logical register name has been renamed to the associated physical register.

Figure 2:
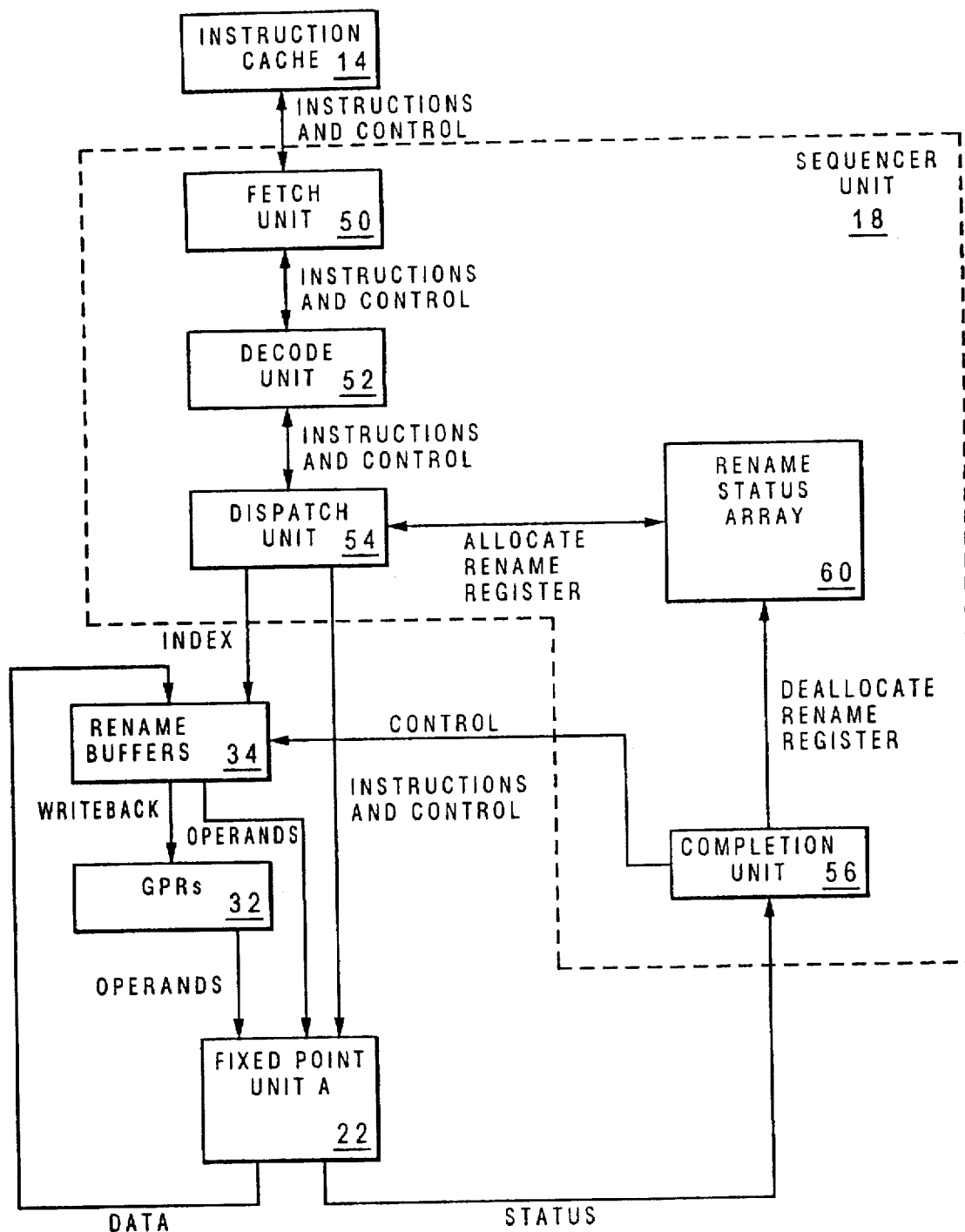
FIG. 2 illustrates a more detailed block diagram of a sequencer unit included within the superscalar data processing system of FIG. 1 in accordance with the method and system of the illustrative embodiment.

FIG. 2 illustrates a more detailed block diagram of a sequencer unit included within the superscalar data processing system of FIG. 1 in accordance with the method and system of the illustrative embodiment. Instructions from instruction cache 14 are loaded into fetch unit 50. This represents the first stage of the pipeline. Instructions and control then pass to decode unit 52 which performs the decode pipeline stage operations.

Instructions and control further pass to dispatch unit 54 which controls the dispatch pipeline stage operation. Up to four decoded instructions may be selectively dispatched by dispatch unit 54. Dispatch unit 54 determines if an instruction writes a logical register. If a logical register is written, dispatch unit 54 reads rename status array 60 to select an available rename and allocates that rename by marking it as used in rename status array 60. The rename index provided by rename status array 60 to dispatch unit 54 is used to index rename buffers 34. Dispatch unit 54 then dispatches the instruction and associated control information to the selected execution unit such as fixed point unit A 22.

Execution units such as fixed point unit A 22 read operands from rename buffers 34 or GPRs 32 and perform the operation indicated by the instruction. When execution of the instruction is complete, the execution unit passes data to rename buffers 34 and status information to completion unit 56. Instructions are completed in order by completion unit 56 in the completion pipeline stage. In the writeback stage, completion unit 56 controls the copying of data from the selected one of rename buffers 34 to the selected one of GPRs 32. Completion unit 56 also signals rename status array 60 to de-allocate the selected rename by marking it as unused in rename status array 60.

Figure 3:
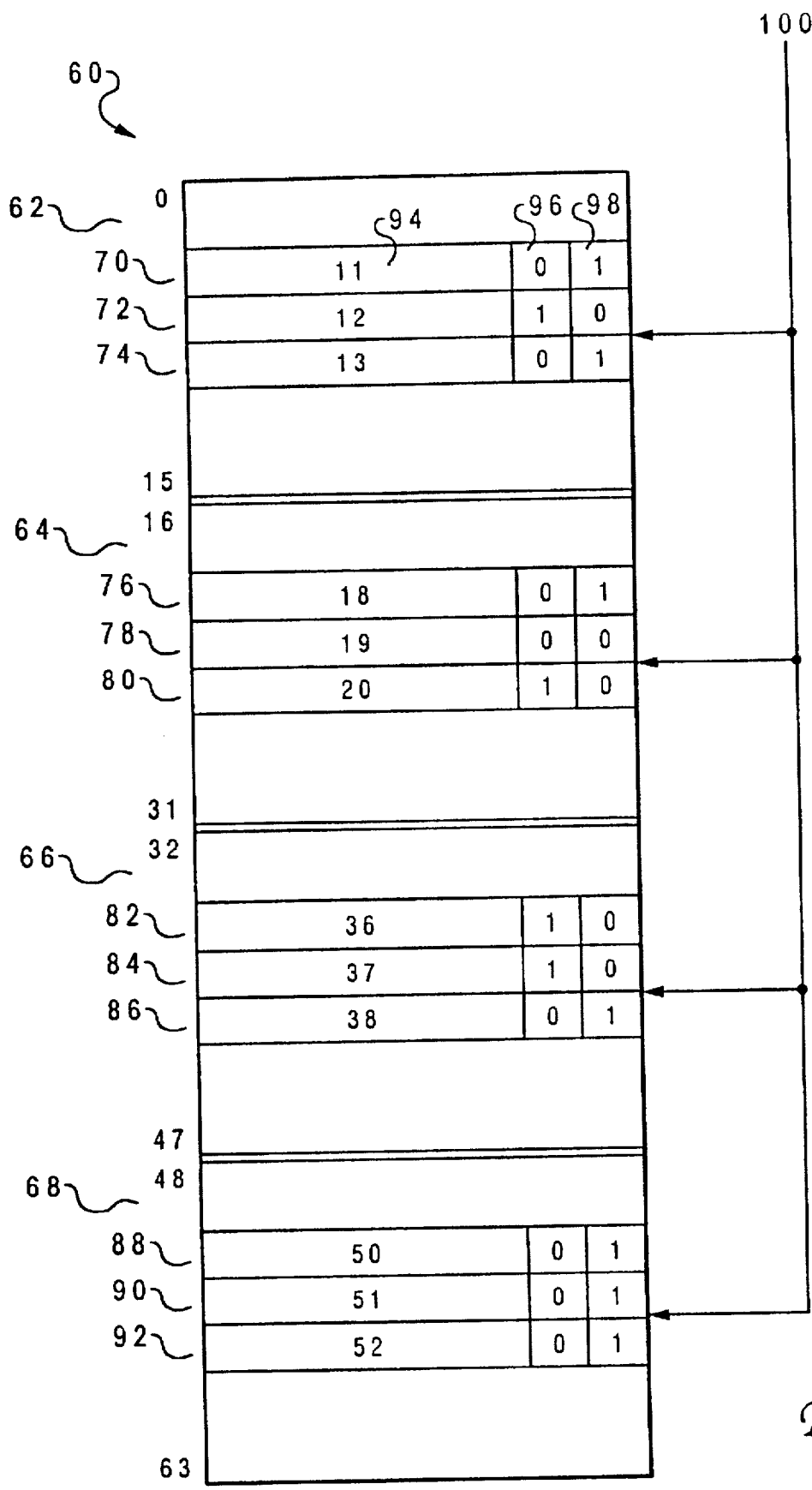
FIG. 3 depicts a pictorial representation of a rename status array included within superscalar data processing system 10 in accordance with the method and system of the illustrative embodiment.

FIG. 3 depicts a pictorial representation of a rename status array 60 included within sequencer unit 18 of superscalar data processing system 10 in accordance with the method and system of the illustrative embodiment. Rename status array 60 is divided into four partitions 62, 64, 66, and 68. Those skilled in the art will recognize that rename status array 60 may be divided into any number of partitions.

Rename status array 60 includes a plurality of entry fields. A different plurality of entry fields are associated with each partition. For example, partitions 62, 64, 66, and 68 each include sixteen (16) entry fields. Therefore, rename status array 60 includes 64 entry fields. Each entry field is associated with one of the partitions. For example, entry fields 70, 72, and 74 are associated with partition 62. Entry fields 76, 78, and 80 are associated with partition 64. Entry fields 82, 84, and 86 are associated with partition 66. Entry fields 88, 90, and 92 are associated with partition 68. Each entry field includes a rename register number field and a status field. Each entry field may also include a valid field or other fields. For example, entry field 70 includes rename register number field 94, valid field 96, and status field 98.

An entry is created for each rename register and stored in the entry field associated with that rename register. A "0" is stored in the status field to indicate that the rename register is not available. A "1" is stored in the status field to indicate that the rename register is available. For example, entry field 70 includes an entry which includes "11" stored in the rename register number field indicating that entry field 70 is associated with rename register 11. The entry also includes a "0" stored in the valid field, and a "1" stored in the status field. Therefore, the entry stored in entry field 70 indicates that rename register 11 is not currently in use in system 10, is available to be associated with a register of an instruction, and that the data stored in rename register 11 is not valid. The entry stored in entry field 72 indicates that rename register 12 is currently in use in system 10, not available to be utilized, and that the data stored in rename register 12 is valid. The process of selecting a rename that is not in use and associating it with the destination register of an instruction is called allocation.

Signal 100 is input into rename status array 60 and includes an indication of a rename register which has now become available. The process of marking a previously allocated rename register as available for use is called de-allocation. Signal 100 includes a six-bit number which indicates which entry field is to be updated. The number of bits is determined by the number of entry field which must be addressed. Therefore, for 64 rename registers, there are 64 entry fields. Thus, a six-bit number is required to address each individual entry field. The entry field included within signal 100 is updated by storing an indication in the status field that the rename register is available.

Each time a rename register is needed, the rename status array is searched to determine the first entry which includes a "1" in the status field of the entry field. The first entry which includes a "1" in the status field of the entry field is then associated with the logical register of the instruction needing a rename register. The entry field for that rename register is then modified by storing a "0" in the status field for the entry. The array is searched sequentially with the first entry, and then each subsequent sequential entry until an entry having a "1" in the status field is found.

The embodiment depicted in FIG. 3 includes four partitions. Each partition is associated with one of the instructions that may be dispatched in a cycle. Therefore, because four instructions may be dispatched in any one clock cycle, a search for four available rename registers, one for each instruction, may be performed concurrently. Those skilled in the art will recognize that any number of partitions may be utilized. For example, by including eight partitions, two associated with each instruction, a faster search may be performed.

Figure 4:
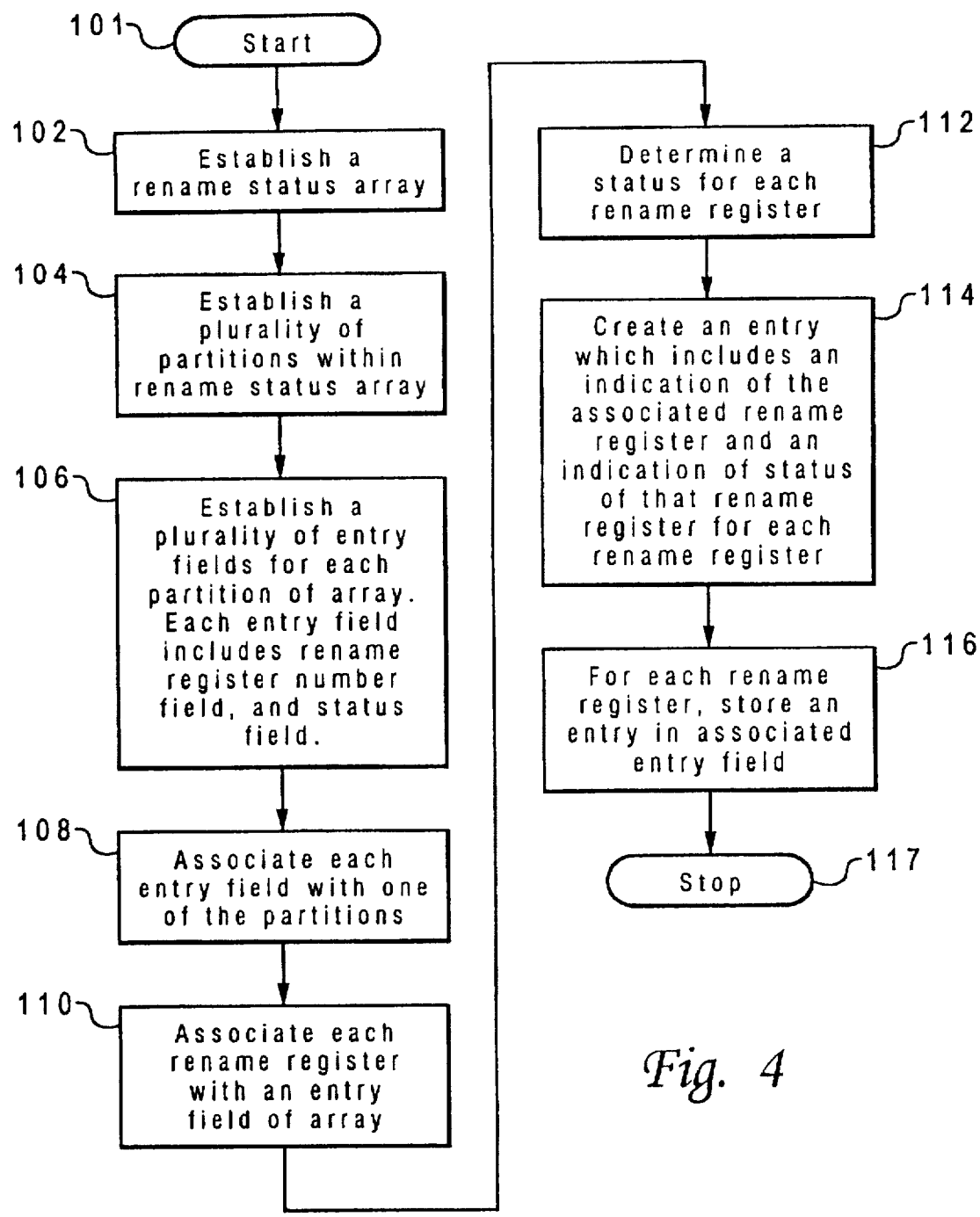
FIG. 4 is a high level flow chart depicting the establishment of a rename status array in accordance with the method and system of the illustrative embodiment.

FIG. 4 is a high level flow chart depicting the establishment of a rename status array in accordance with the method and system of the illustrative embodiment. The process starts as depicted at block 101 and thereafter passes to block 102 which illustrates the establishment of a rename status array. Block 104 then illustrates the establishment of a plurality of partitions within the rename status array. The process then passes to block 106 which depicts the establishment of a different plurality of entry fields for each partition of the register status array. Each entry field includes a rename register number field, a status field, and may include other fields such as a valid field.

Next, block 108 illustrates the association of each entry field with one of the partitions. Block 110 then depicts the association of each rename register with an entry field of the rename status array. Thereafter, block 112 illustrates the determination of a status for each rename register. Each rename register may have a status of either available, or unavailable. Block 114 depicts a creation of an entry which includes an indication of the associated rename register and an indication of the status of that rename register for each rename register. The process then passes to block 116 which depicts the storing of an entry in the associated entry field for each rename register. The process then terminates as depicted by block 117.

Figure 5:
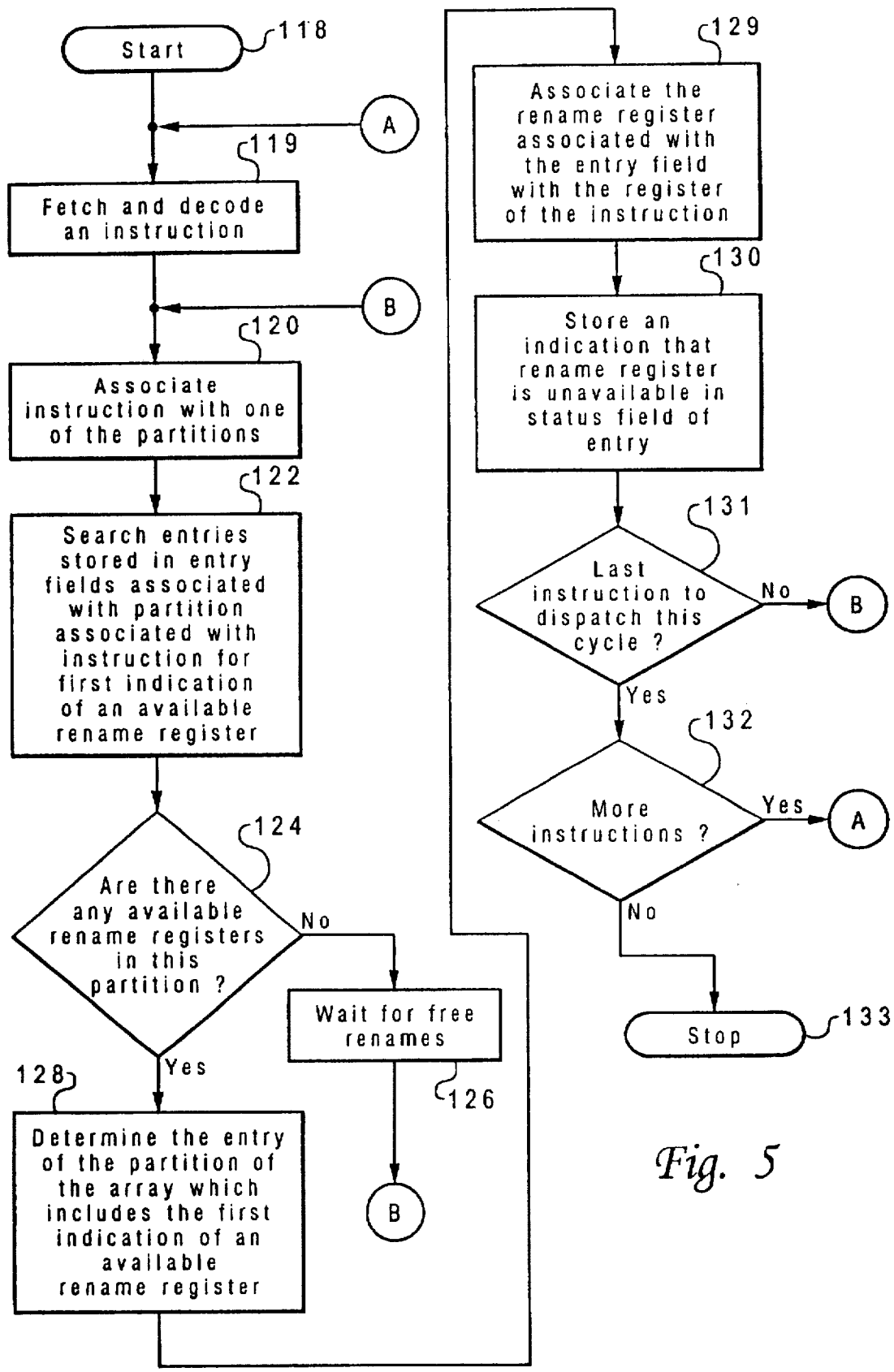
FIG. 5 is a high level flow chart depicting the allocation of available rename registers using entries stored in a rename status array in accordance with the method and system of the illustrative embodiment.

FIG. 5 is a high level flow chart depicting the allocation of available rename registers using entries stored in a rename status array in accordance with the method and system of the illustrative embodiment. The process starts as depicted by block 118 and then passes to block 119 which illustrates the fetching and decoding of an instruction. The process then passes to block 120 which depicts the association of the instruction with one of the partitions. Block 122 then illustrates the searching of the entries stored in the entry fields associated with the partition which is associated with the instruction. The search is performed by searching the entry fields sequentially until an entry field is found which includes a indication of an available rename register. The process then passes to block 124 which depicts a determination of whether or not there are any available rename registers in the partition associated with this instruction. If a determination is made that there are no available rename registers in the partition associated with this instruction, the process passes to block 126 which depicts the waiting for free renames. The process then passes back to block 120 as depicted through connector B.

Referring again to block 124, if a determination is made that there are available rename registers in the partition associated with this instruction, the process passes to block 128. Block 128 illustrates the determination of the entry of the partition of the array which included the first indication of an available rename register. Next, block 129 depicts the association of the rename register associated with the entry field with the logical register of this instruction. Therefore, the logical register associated with this instruction is renamed to be the first available rename register within the partition associated with this instruction. Thereafter, block 130 illustrates the storing in the status field of the entry associated with this rename register of an indication that this rename register is now unavailable.

Next, block 131 depicts a determination of whether or not this is the last instruction to dispatch during this cycle. If a determination is made that this is not the last instruction to dispatch during this cycle, the process passes back to block 120 as depicted through connector B. If a determination is made that this is the last instruction to dispatch during this cycle, the process passes to block 132 which illustrates a determination of whether or not there are more instructions. If a determination is made that there are more instructions, the process passes back to block 119 as depicted through connector A. If a determination is made that there are no more instructions, the process then terminates as depicted by block 133.

Figure 6:
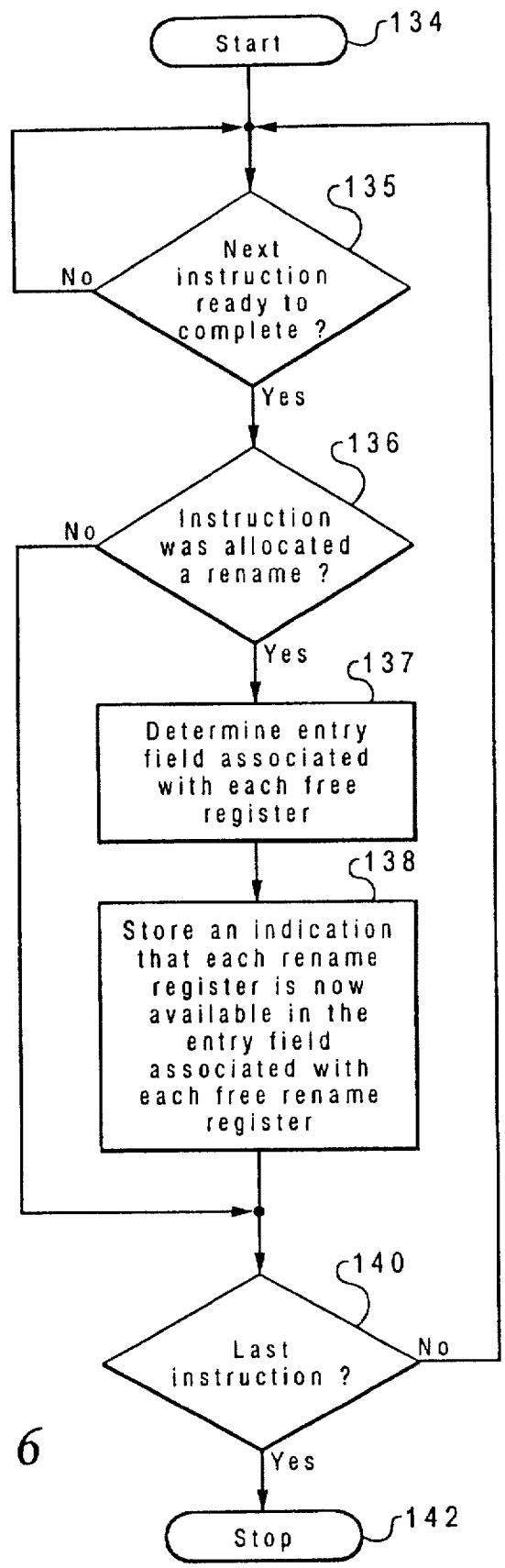
FIG. 6 is a high level flow chart depicting the de-allocation of rename registers using entries stored in a rename status array in accordance with the method and system of the illustrative embodiment.

FIG. 6 is a high level flow chart depicting the de-allocation of rename registers using entries stored in a rename status array in accordance with the method and system of the illustrative embodiment. The process starts as depicted by block 134 and then passes to block 135 which illustrates a determination of whether or not the next instruction is ready to complete. If a determination is made that the next instruction is not ready to complete, the process passes back to block 135. Referring again to block 135, if a determination is made that the next instruction is ready to complete, the process passes to block 136 which illustrates a determination of whether or not the instruction was allocated a rename. If a determination is made that the instruction was not allocated a rename, the process passes to block 140.

Referring again to block 136, if a determination is made that the instruction was allocated a rename, the process passes to block 137 which depicts the determination of each entry field which is associated with a free rename register. Next, block 138 illustrates the storing of an indication the rename register is available in the entry field for each free rename register. Thereafter, block 140 depicts a determination of whether or not this is the last instruction for this cycle. If a determination is made that this is not the last instruction for this cycle, the process passes back to block 135. If a determination is made that this is the last instruction for this cycle, the process terminates as depicted at block 142.

While the embodiment has been particularly shown and described, it will be understood by those skilled in the art that various changes in form and detail may be made therein without departing from the spirit and scope of the embodiment.

We claim:

1. A method in a data processing system for efficiently managing an indication of a status of each of a plurality of registers included within said data processing system, said method comprising the steps of:

establishing an array having multiple entry fields for storing multiple entries;

associating each of said multiple entry fields with a different none of said plurality of registers;

determining a status of each of said plurality of registers;

establishing a plurality of partitions within said array, said plurality of partitions being concurrently accessible by said data processing system;

associating a different plurality of said multiple entry fields with each of said plurality of partitions, so that each of said multiple entry fields is associated with one of said plurality of partitions; and storing an entry in each of said multiple entry fields, said entry including an indication of a status of said one of said plurality of registers associated with said entry field in which said entry is stored, so that said entry is associated with one of said plurality of partitions.

2. The method according to claim 1 further comprising the steps of:

concurrently accessing a plurality of said multiple entries, so that each of said plurality of said multiple entries is associated with a different one of said plurality of partitions; and for each of said plurality of partitions, determining a first of said plurality of said multiple entries associated with a particular status.

3. The method according to claim 2, wherein said data processing system further includes multiple instructions to be processed in a single clock cycle, each of said multiple instructions including a plurality of instructions, each of said plurality of instructions having an associated logical register, further comprising the steps of:

associating each of said multiple instructions with a different one of said plurality of partitions;

determining whether said each of said multiple instructions includes one of said plurality of instructions having an associated logical register; and in response to a determination wherein said each of said multiple instruction includes one of said plurality of instruction and a determination wherein said first of said plurality of said multiple entries is associated with said particular status, associating one of said plurality of registers associated with said multiple entry field in which said first of said plurality of multiple entries is stored with said associated logical register of said one of said plurality of instructions.

4. The method according to claim 1, wherein said step of determining a status of each of said plurality of registers further includes the step of determining an availability of said each of said plurality of registers.

5. A data processing system for efficiently managing an indication of a status of each of a plurality of registers included within said data processing system, comprising:

means for establishing an array having multiple entry fields for storing multiple entries;

means for associating each of said multiple entry fields with a different one of said plurality of registers;

means for determining an indication of status of each of said plurality of registers;

means for establishing a plurality of partitions within said array, said plurality of partitions being concurrently accessible by said data processing system;

means for associating a different plurality of said multiple entry fields with each of said plurality of partitions, so that each of said multiple entry fields is associated with one of said plurality of partitions; and means for storing an entry in each of said multiple entry fields, said entry including an indication of a status of one of said plurality of registers associated with an entry field in which said entry is stored, so that said entry is associated with one of said plurality of partitions.

6. The system according to claim 5 further comprising:

means for concurrently accessing a plurality of said multiple entries, so that each of said plurality of said multiple entries is associated with a different one of said plurality of partitions; and for each of said plurality of partitions, means for determining a first of said plurality of said multiple entries associated with a particular status.

7. The system according to claim 6, wherein said data processing system further includes multiple instructions to be processed in a single clock cycle, each of said multiple instructions including a plurality of instructions, each of said plurality of instructions having an associated logical register, further comprising:

means for associating each of said multiple instructions with a different one of said plurality of partitions;

means for determining whether said each of said multiple instructions includes one of said plurality of instructions having an associated logical register; and means responsive to a determination wherein said each of said multiple instruction includes one of said plurality of instruction and a determination wherein said first of said plurality of said multiple entries is associated with said particular status, for associating one of said plurality of registers associated with said multiple entry field in which said first of said plurality of multiple entries is stored with said associated logical register of said one of said plurality of instructions.

8. The system according to claim 5, wherein said means for determining a status of each of said plurality of registers further includes means for determining an availability of said each of said plurality of registers.

* * * * *

UNITED STATES PATENT AND TRADEMARK OFFICE
CERTIFICATE OF CORRECTION

PATENT NO. : 5,765,017
DATED : June 9, 1998
INVENTOR(S) : Thomas A. Hoy et al.

It is certified that error appears in the above-identified patent and that said Letters Patent is hereby corrected as shown below:

In Col. 9, line 17, please change "none" to --one--.

Signed and Sealed this

Nineteenth Day of January, 1999

Attest:

Attesting Officer

*Acting Commissioner of Patents and Trademarks*